Oct. 6, 1970 — R. J. KOPF — 3,532,312
STRAND-RETAINING CLIP
Filed Nov. 28, 1967

INVENTOR:
ROWLAND J. KOPF

BY William W. Jones

ATTORNEY

United States Patent Office 3,532,312
Patented Oct. 6, 1970

3,532,312
STRAND-RETAINING CLIP
Rowland J. Kopf, North Haven, Conn., assignor to Olin Mathieson Chemical Corporation, a corporation of Virginia
Filed Nov. 28, 1967, Ser. No. 686,171
Int. Cl. F16l 3/12
U.S. Cl. 248—68                                       1 Claim

ABSTRACT OF THE DISCLOSURE

A clip having fastener-receiving means at one end thereof terminating in a post element adjacent to the fastener-receiving means and normal thereto, and a loop at the other end thereof terminating at a point laterally spaced apart from the post to define strand-retaining and supporting means therewith.

---

This invention relates to a clip for removably retaining and supporting a bundle of wires or strands. This clip is of the general type commonly known in the art as a "wire loop" and is formed from a single elongated rigid element.

It is old in the art to provide a clip which is attached to a surface to retain and support a bundle of wires or strands adjacent to the surface. Such clips, when formed from a single elongated rigid element, are commonly known as "wire loops" and are widely used in the communications field, electrical field, or other wire stringing areas wherein a clip is needed to retain and support a strung bundle of strands along a surface, and wherein it is desirable to provide means whereby individual strands can be removed from the clip or added to the bundle in the clip quickly and easily. Such prior art clips are formed from a rigid elongated element which is bent into a generally U-shaped configuration into which the strands are strung. One end of one leg of the U-shaped clip of the prior art is curled back upon itself to form fastener-receiving means, with the plane of the fastener-receiving means being generally perpendicular to the plane of the strand-receiving portion. Such prior art clips require the use of a special fastener having a longitudinally protracted head to close off the strand-receiving portion of the clip. When the special fastener is driven into engagement with the fastener-receiving end of the clip, the protracted head of the fastener is generally normal to the plane of the fastener-receiving means and extends to a point laterally spaced apart from the other end of the clip. Thus, the clip and the protracted head of the special fastener combine to present a peripherally closed area with respect to a taut strand, and yet the space between the head of the fastener and the other end of the clip permits slack strands to be moved into and removed from the clip.

In recent years power actuated devices have become extremely popular in the fastening industry. The use of a propellant as an energy source results in time savings and increased anchor quality. Clips fall into this category. There is need in the industry for a suitable combination of power actuated tool and clip fasteners that will provide a safe method for attaching such clips.

Conventional power actuated tools, because of the high velocity required to properly set such clip fasteners are not desirable from a safety stand point. A low velocity tool, such as a piston-type tool, more closely approaches the solution to this safety problem. However, present commercially available piston tools generally permit potential escape velocities of up to 300 feet per second. While this escape velocity is considered safe for most industries, certain conditions, such as the use of the product in occupied buildings by the wire stringing industries, command attention to the potential kinetic energy of the fastener in the event of an inadvertent drive through wall material, such as plasterboard. It is undesirable to drive the prior art protracted head fastener with a power actuated tool, even of the piston tool variety, because the protracted portion of the head of this fastener increases the weight thereof to the extent that the potential kinetic energy of the fastener at escape velocities approaching 300 feet per second exceeds acceptable standards of safety.

The preferred embodiment of the clip of this invention includes means formed at one end thereof for engagement with a nail or other fastener to attach the clip to a surface, such as a wall, or the like. The fastener-receiving end terminates in a post member which is generally normal thereto. The other end of the clip is turned to form a loop terminating at a point laterally spaced apart from the post to define therewith strand-retaining and supporting means.

It is an object of this invention to provide an improved clip for the retention and support of a bundle of strung strands.

It is a further object of this invention to provide a clip which can be utilized to retain and support a bundle of strung strands and which can be attached to a surface with a standard flat-headed fastener.

It is a still further object of this invention to provide a clip of the "wire loop" variety which adequately performs the functional requirements of a closed circle, but which meets those requirements under conditions wherein the fastener is extremely lightweight and the post section of the clip is formed in the clip proper.

Other and further objects and advantages, and features of this invention will be apparent to those skilled in the art from the following descriptions together with the accompanying drawings, in which.

Figure 1:
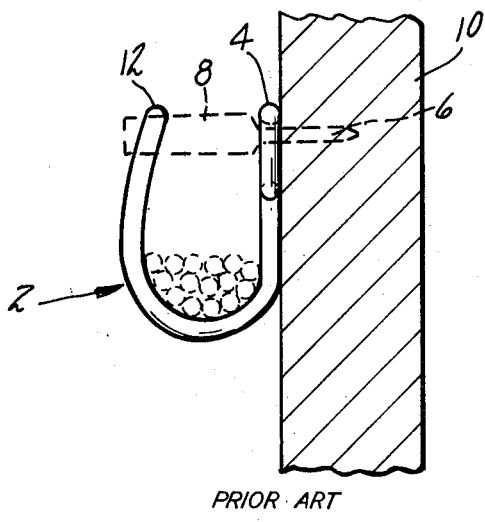
FIG. 1 is a side view of a clip and protracted head fastener of the prior art attached to a wall.
Figure 2:
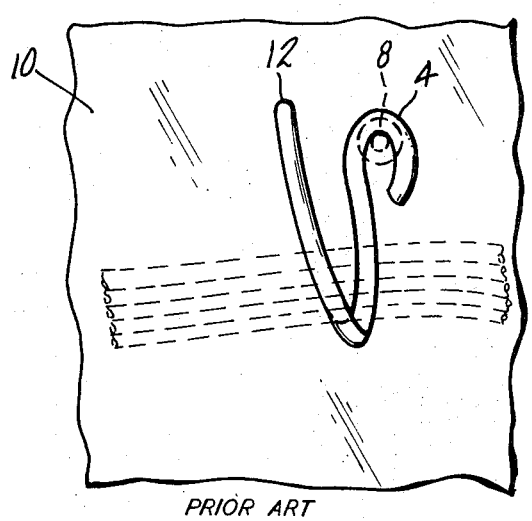
FIG. 2 is a front view of the prior art clip and fastener of FIG. 1.

Referring more particularly to the drawings, FIG. 1 discloses an embodiment of the prior art. The clip, indicated generally by the numeral 2, is bent into a U-shaped configuration, one leg 4 of which is curled back upon itself to form an opening for the reception of a fastener 6 (shown in phantom lines). The fastener 6 includes a longitudinally protracted head 8 which, when the fastener 6 is driven into a plasterboard wall 10, is laterally spaced apart from the other leg 12 of the clip so as to present therewith a closed circle with respect to a taut wire disposed in the clip (see FIG. 1), while at the same time providing a space through which a slack strand can be inserted into the clip (see FIG. 2).

Figure 3:
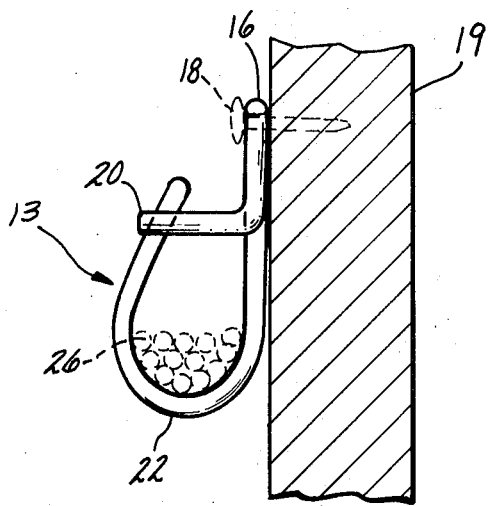
FIG. 3 is a side view of the preferred embodiment of the clip of this invention fastened to a wall.
Figure 4:
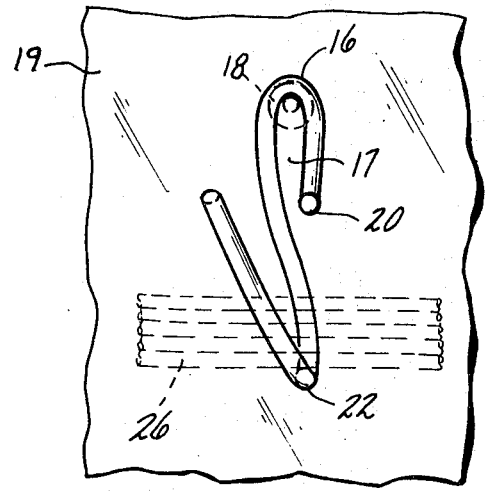
FIG. 4 is a front view of the embodiment of the clip of this invention shown in FIG. 3.

Referring now to FIGS. 3 and 4, the preferred embodiment of the clip of this invention, indicated generally by the numeral 13, is formed from a single elongated rigid element and has a first end part 16 which is doubled back upon itself to form a fastener-receiving opening 17. A flat-headed fastener 18 (depicted in phantom lines) is driven through the fastener-receiving opening 17 and into a plasterboard wall 19 to attach the clip 13 thereto. The first end part 16 terminates in a post 20 which is generally normal to the plane of the opening 17. The clip 13 further has a second end part which is bent to form a loop 22 terminating at a point laterally spaced apart from the post 20. The loop 22 forms a cradle for the retention and support of a bundle of strands 26 (shown in phantom) and the post 20 serves to close the strand-receiving cradle with respect to a taut strand disposed therein, as is clearly shown in FIG. 3. Moreover, the space between the post 20 and the terminal of the loop 22, clearly shown in FIG. 4, permits slack strands to be moved into, or removed from the strand-receiving cradle.

The inclusion of a post element as an integral part of the clip of this invention permits the use of a lighter, flat-headed fastener to attach the clip to a comparatively thin supporting surface. The reduction in weight of this fastener over the elongated-head fastener conventionally used with such clips permits the safe use of a power actuated tool to drive the fastener into the comparatively thin supporting surface due to the lowering of kinetic energy of the lighter fastener when driven by the power actuated tool.

Since many changes and variations of the disclosed embodiment of this invention may be made without departing from the inventive concept, it is not intended to limit the invention otherwise than as required by the appended claim.

What is claimed is:

1. A clip adapted to be secured to a planar supporting surface, said clip consisting of a one-piece, elongate, rigid element, said element comprising: a first portion defining a fastener-receiving opening, said first portion being contained in planes substantially parallel to the planar supporting surface; a second portion defining a post laterally adjacent to said fastener-receiving opening and generally perpendicular, throughout substantially its entire length, to the planar supporting surface; and a third portion defining a loop terminating at a point laterally offset from said post, and said third portion further extending beyond said post and toward the planar supporting surface, said third portion and said post combining to define means for receiving and supporting a bundle of strands having an axis, said means presenting a closed configuration when viewed in a plane normal to the strand axis, and said means presenting an open configuration when viewed in a plane parallel to the strand axis.

References Cited

UNITED STATES PATENTS

| 1,623,792 | 4/1927 | Karitzky | 248—69 |
| 831,985 | 9/1906 | Pettingell | 248—303 X |
| 1,331,524 | 2/1920 | Pleister | 248—71 |
| 1,554,740 | 9/1925 | Licht | 248—303 |
| 2,642,242 | 6/1953 | Karitzky | 248—71 |

CHANCELLOR E. HARRIS, Primary Examiner

U.S. Cl. X.R.

248—71, 303